United States Patent [19]
Evenson

[11] Patent Number: 5,511,750
[45] Date of Patent: Apr. 30, 1996

[54] MOUNTING BRACKETS FOR MOTOR VEHICLE RUNNING BOARDS

[75] Inventor: Martin Evenson, Dallas, Tex.

[73] Assignee: Morgan Industries, Inc., Dallas, Tex.

[21] Appl. No.: 210,925

[22] Filed: Mar. 21, 1994

[51] Int. Cl.⁶ .................................................. F16M 11/00
[52] U.S. Cl. ...................... 248/200; 280/163; 248/205.1
[58] Field of Search .................................. 248/200, 201, 248/205.1, 207

[56] References Cited

U.S. PATENT DOCUMENTS

| | | | |
|---|---|---|---|
| 3,756,164 | 9/1973 | Miller et al. | 105/457 |
| 4,167,272 | 9/1979 | Wright et al. | 280/163 |
| 4,266,792 | 5/1981 | Sanders et al. | 280/153 R |
| 4,311,320 | 1/1982 | Waters, Jr. | 280/163 |
| 5,193,829 | 3/1993 | Holloway et al. | 280/163 |
| 5,265,896 | 11/1993 | Kravitz | 280/163 |
| 5,286,049 | 2/1994 | Khan | 280/163 |

*Primary Examiner*—Leslie A. Braun
*Assistant Examiner*—Anita King
*Attorney, Agent, or Firm*—John M. Cone

[57] ABSTRACT

A bracket for retro fitting running boards to existing motor vehicles comprises a rigid Z-shaped, main body which is connected at an upper end to the underside of the vehicle and at a lower end to a running board. A relatively flexible strap which extends upwardly from the lower portion of the Z-shaped body is connected to the rocker panel of the vehicle body.

7 Claims, 1 Drawing Sheet

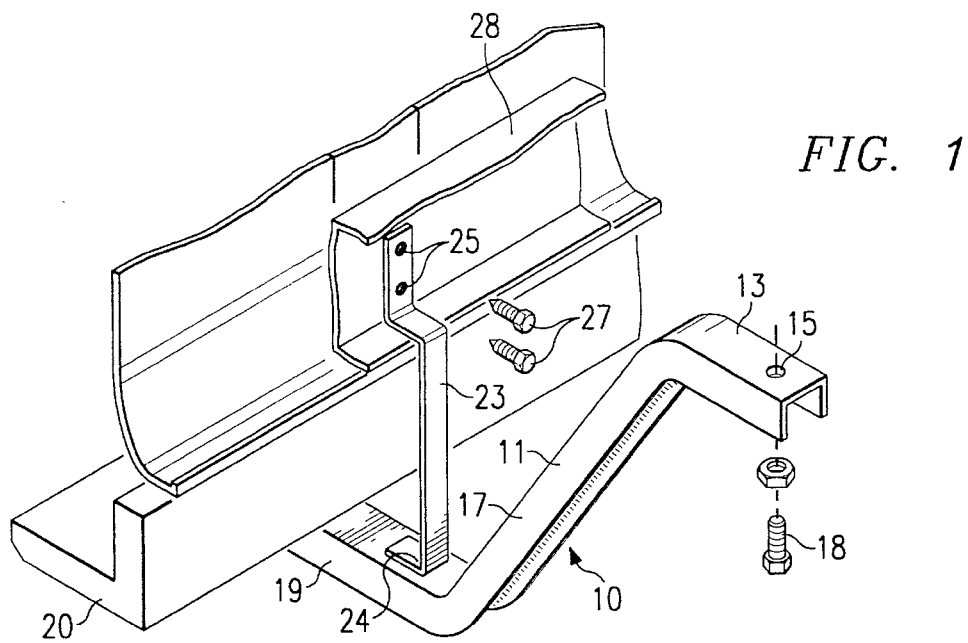
FIG. 1
FIG. 2
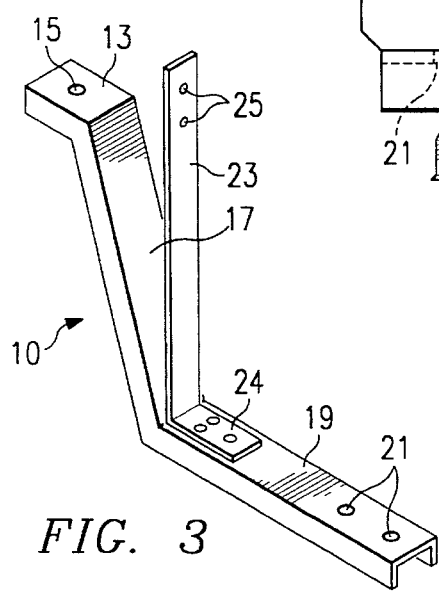
FIG. 3

MOUNTING BRACKETS FOR MOTOR VEHICLE RUNNING BOARDS

BACKGROUND OF THE INVENTION

The present invention relates to brackets for mounting running boards to motor vehicles.

Many pickup trucks and vans are manufactured and sold without running boards and an important market exists in fitting running boards to these vehicles after they have left their original manufacturer.

Prior to the present invention, running boards were mounted to a vehicle using a three-piece kit of parts that had to be bolted together to form a triangular bracket. This assembly was difficult and time consuming.

OBJECT OF THE INVENTION

It is an object of the present invention to provide an improved bracket for mounting a running board to an existing motor vehicle which is simple and convenient to use and which greatly reduces the time taken to retro-fit running boards, as compared to the prior art.

SUMMARY OF THE INVENTION

According to the present invention there is provided a bracket for mounting a running board to a motor vehicle comprising a z-shaped main member having an upper end portion for securing the bracket to the underside of the vehicle and a lower portion for supporting the running board, the lower portion being vertically and laterally displaced from the upper portion to provide correct location of the running board, of the main member and a securing arm extending upwardly from the lower portion for securing the bracket to the rocker panel of the vehicle, the securing arm being formed of a material that is relatively deformable to enable the upper portion of the arm to conform to the slope of the rocker panel of the vehicle and to be secured thereto.

BRIEF DESCRIPTION OF THE DRAWINGS

A preferred embodiment of the invention will now be described, with reference to the accompanying drawings, in which:

FIG. 1 shows a view of the underside of a pick-up truck illustrating a bracket embodying the invention; FIG. 1.

FIG. 2 is a vertical section through the embodiment shown in

FIG. 3 is a perspective view of the bracket embodying the invention.

DETAILED DESCRIPTION OF THE PREFERRED EMBODIMENT

As best seen in FIG. 1, a bracket 10 comprises a rigid, approximately Z-shaped, one piece, main body 11 of channel sectioned, 14-gauge, galvanized sheet steel. The body 11 comprises an upper portion 13 which is disposed approximately horizontally in use. The upper portion 13 has a 10 mm hole 15 by which the bracket 10 is secured to the underside 16 (FIG. 2) of the vehicle in the region of the cab, for example by means of a bolt 18 that secures the seat of the vehicle. A mid-portion 17 of the bracket 10 interconnects the upper portion 13 to a lower portion 19 of the bracket that is also approximately horizontal in use and is displaced laterally from the upper portion 13. The displacement is caused by the disposition of the mid-portion 17, which extends at an angle of less than 90° from the horizontal, as shown by angle A in FIG. 2.

In the outboard end of the lower portion 19 are formed two ¼" holes 21 on a 1" centers. These holes 21 accommodate ¼" wood screws 22 that secure the outboard end of the lower portion 19 of the bracket 10 to the underside of the running board 20 to mount the running board 20 on the vehicle.

The bracket 10 further comprises an L-shaped arm 23 of 18 gauge galvanized sheet steel. The bottom portion 24 of the arm 23 is secured, as by spot welding, to the upper side of the lower portion 19 of the main body 11 adjacent to the junction between the lower portion 19 and the mid-portion 17 and extends approximately vertically upward therefrom. At its upper end, the arm 23 is provided with two ¼" holes 25 on 1" centers. The material of which the arm 23 is formed is relatively flexible, so the free end of the arm can be deformed to conform to the under side of the rocker panel 28 of the vehicle. In use, screws 27 extend through the holes 25 to secure the free end of the arm 23 to the underside of a rocker panel 28 of the vehicle.

Using the bracket described above allows a running board to be bolted to, e.g., a pickup truck or utility vehicle in approximately two (2) minutes, compared to the ten (10) minutes required to secure a running board using the prior art bracket.

I claim:

1. A bracket for mounting a running board to a motor vehicle comprising:

a z-shaped member having an upper portion for securing the bracket to an underside of the vehicle and a lower portion for supporting a running board, the lower portion being vertically and laterally displaced from the upper portion to provide correct location of the running board;

and a securing arm secured to and extending upwardly from the lower portion for securing the bracket to a rocker panel of the vehicle, the securing arm being formed of a thin gauge sheet material that is relatively deformable to enable an upper portion of the securing arm to conform to a slope of the rocker panel of the vehicle and to be secured thereto.

2. A bracket as claimed in claim 1 wherein the z-shaped member has a U-shaped cross-section.

3. A bracket for mounting a running board to a motor vehicle comprising:

an elongated member having a first end and a second end, each end extending obtusely and horizontally from the member in opposing directions;

the first end having a plurality of openings for securing the bracket to an underside of the vehicle;

the second end having a plurality of openings for securing the running board to the bracket; and an easily adjustable securing arm affixed to the second end and extending upwardly from the second end to secure the bracket to a rocker panel of the vehicle and said arm being formed of a thin gauge sheet material.

4. The bracket according to claim 3, wherein the securing arm thin gauge sheet formed of a material is relatively deformable to enable the arm to be adjusted to secure it to the rocker panel.

5. The bracket according to claim 4, wherein the elongated member is a U-shaped channel member.

6. In combination with a vehicle a running board assembly comprising:

a running board;

the vehicle having a rocker panel and an underside; and a bracket mounting the running board to the vehicle, said running board assembly comprises:

an elongated member having a first end and a second end, each end extending horizontally from the member in opposing directions;

the first end having a plurality of openings for engaging a means securing the bracket to the underside of the vehicle;

the second end having a plurality of openings engaging a means securing the running board to the bracket; and a securing arm affixed to the second end and extending upwardly from the second end securing the bracket to the rocker panel said arm being formed of a thin gauge sheet material.

7. In combination, a motor vehicle having a body, an underside to said body, and a rocker panel;

a running board mounted to the vehicle body;

a bracket supporting and securing said running board and comprising a vertically disposed z-shaped member having an upper portion secured to the underside of the body, a lower portion supporting the running board and a securing arm being formed of a thin gauge sheet of material secured to and extending from the z-shaped member and connected at its end remote from the z-shaped member to the rocker panel whereby the running board is supported in part by the rocker panel.

* * * * *